(12) United States Patent
Tisdel

(10) Patent No.: US 10,896,360 B2
(45) Date of Patent: Jan. 19, 2021

(54) TRACKING SYSTEMS, METHODS AND APPARATUS

(71) Applicant: Ken G. Tisdel, Richmond, TX (US)

(72) Inventor: Ken G. Tisdel, Richmond, TX (US)

( * ) Notice: Subject to any disclaimer, the term of this patent is extended or adjusted under 35 U.S.C. 154(b) by 0 days.

(21) Appl. No.: 16/281,437

(22) Filed: Feb. 21, 2019

(65) Prior Publication Data
US 2020/0184291 A1 Jun. 11, 2020

Related U.S. Application Data

(60) Provisional application No. 62/778,210, filed on Dec. 11, 2018.

(51) Int. Cl.
*G06K 19/04* (2006.01)
*G06K 19/07* (2006.01)
*G06K 19/06* (2006.01)

(52) U.S. Cl.
CPC ..... *G06K 19/041* (2013.01); *G06K 19/06037* (2013.01); *G06K 19/0723* (2013.01)

(58) Field of Classification Search
CPC .................................................... G06K 19/041
USPC ........................................ 235/383, 381, 380
See application file for complete search history.

(56) References Cited

U.S. PATENT DOCUMENTS

| 2010/0265068 A1 | 10/2010 | Brackmann et al. |
| 2011/0210819 A1 | 9/2011 | Berland et al. |
| 2014/0002239 A1 | 1/2014 | Rayner |
| 2017/0232300 A1 | 8/2017 | Tran et al. |
| 2018/0139171 A1* | 5/2018 | Klitenik ................. H04W 64/00 |
| 2019/0277937 A1* | 9/2019 | Li .......................... G01S 5/0236 |
| 2019/0354921 A1* | 11/2019 | Bolta ...................... H04W 4/33 |

OTHER PUBLICATIONS

International Search Report and Written Opinion dated Jun. 6, 2019 (issued in PCT Application No. PCT/US2019/019944) [17 pages].
Barclay, Iain; Innovative Applications of Blockchain Technology in Crime and Security, Sep. 18, 2017, ResearchGate Page, Title Page, Abstract, Table of Contents (3 Pages), pp. 1-74 (80 Pages Total), ResearchGate, https://www.researchgate.net/publication/327915599.
Barclay, Iain; Using Blockchain for Secure Information Sharing, Sep. 27, 2017, 6 Pages, Medium, https://medium.com/@iainbarclay/using-blockchain-for-secure-information-sharing-296ced023481.
Davidson, Al; Increasing Trust in Criminal Evidence with Blockchains, Nov. 2, 2017, 4 Pages, MOJ Digital & Technology, https://mojdigital.blog.gov.uk/2017/11/02/increasing-trust-in-criminal-evidence-with-blockchains/.

(Continued)

*Primary Examiner* — Allyson N Trail
(74) *Attorney, Agent, or Firm* — Michael S. McCoy; Amatong McCoy LLC

(57) ABSTRACT

A tracking system is disclosed. The system includes a wireless tracker having a machine-readable identification and an antenna configured to receive and transmit wireless signals; a fastener that includes a machine-readable identification; and a container capable of receiving and containing physical items. The fastener is capable of coupling with the wireless tracker and container to secure the wireless tracker to the container and secure the container in a closed configuration. Also disclosed are method of remotely monitoring items, and management software for tracking items using blockchain technology.

24 Claims, 8 Drawing Sheets

(56) References Cited

OTHER PUBLICATIONS

Froelings, Lisa; Blockchain to Secure Digital Crime Evidence, British Ministry of Justice Official; Nov. 8, 2017, 5 Pages, Cointelegraph, https://cointelegraph.com/news/blockchain-to-secure-digital-crime-evidence-british-ministry-of-justice-official.
Marrinan, Paul; What Could Blockchain Mean for Law Enforcement?, Jan. 24, 2018, 10 Pages, Medium, https://medium.com/@paul_62765/what-could-blockchain-mean-for-law-enforcement-7bbc8873e6b4.

* cited by examiner

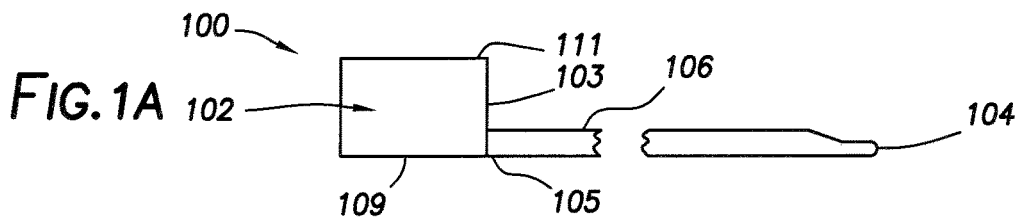
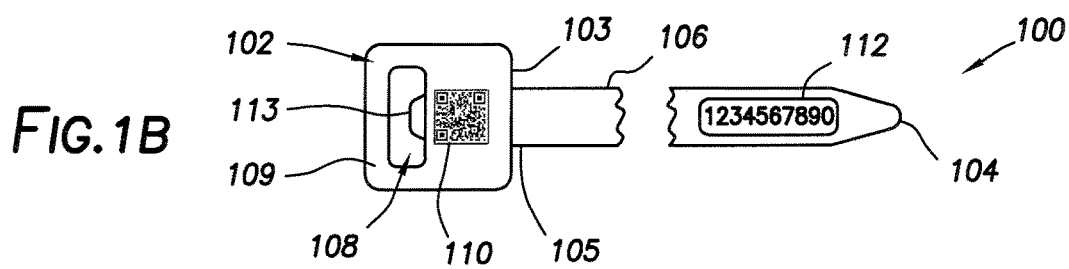
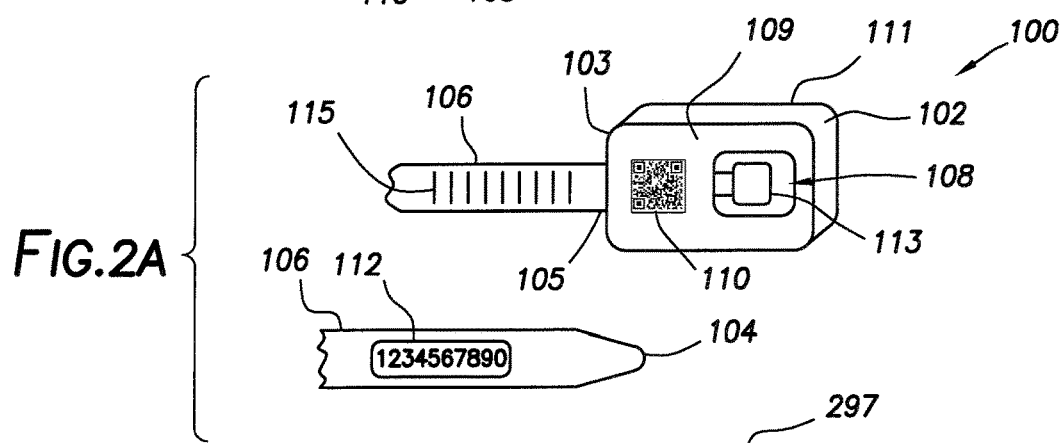
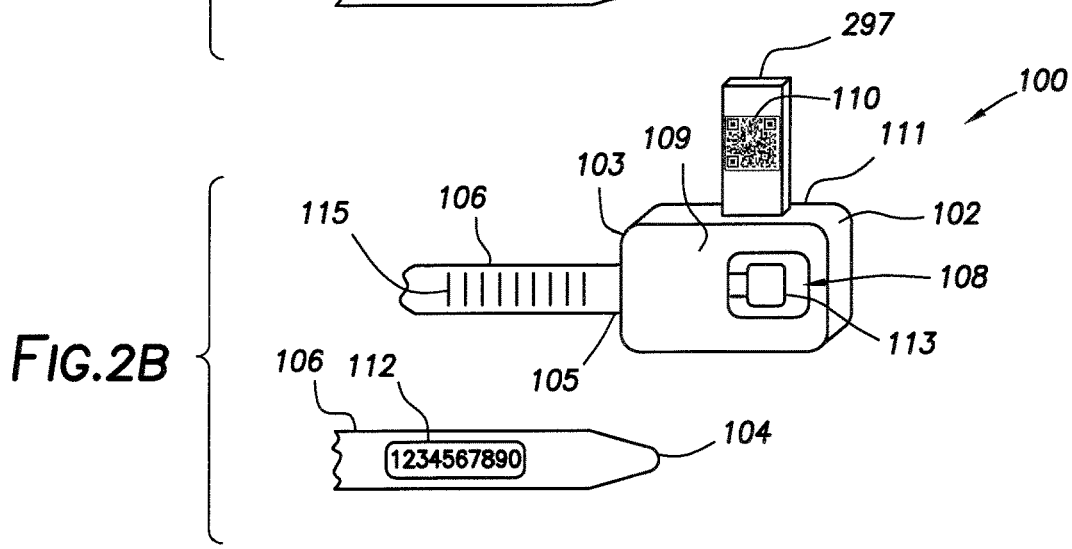
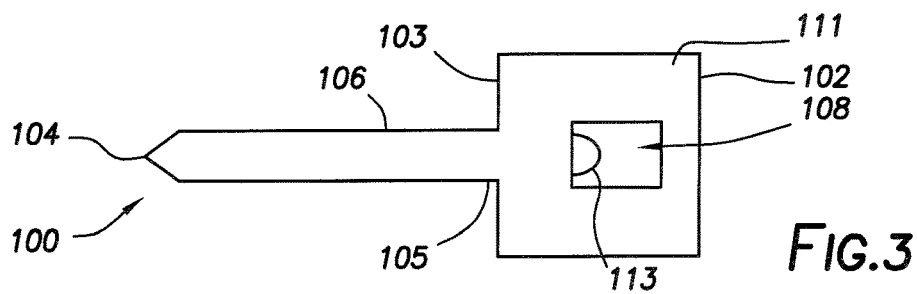

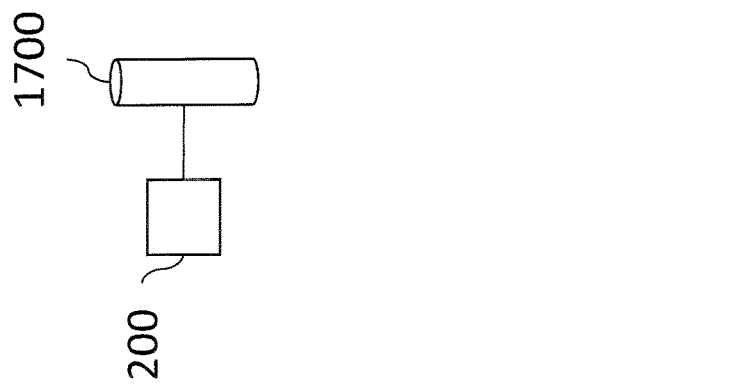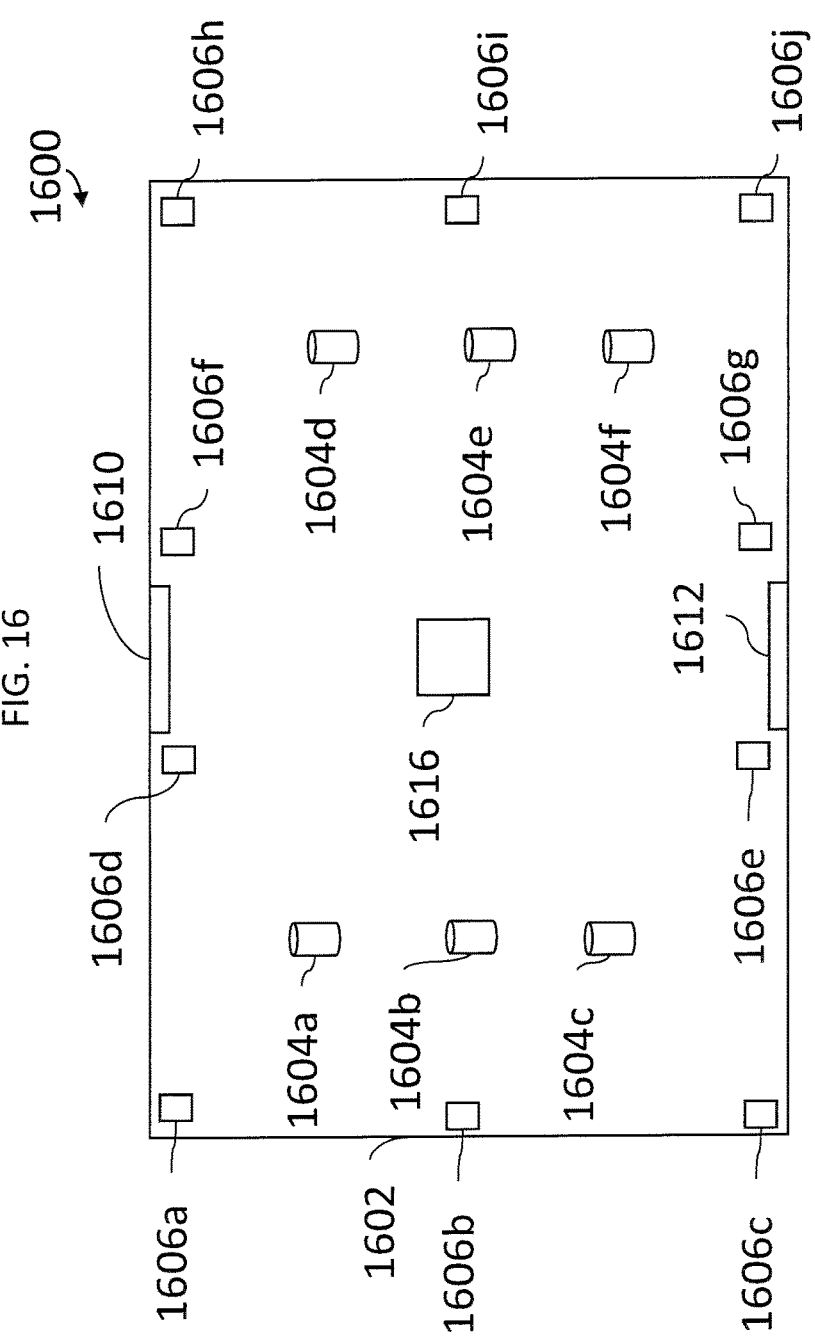

TRACKING SYSTEMS, METHODS AND APPARATUS

CROSS-REFERENCE TO RELATED APPLICATIONS

The present application claims the benefit of U.S. Provisional Patent Application No. 62/778,210, filed on Dec. 11, 2018, entitled "Evidence Tracking Systems, Methods and Apparatus", the entirety of which is incorporated herein by reference.

FIELD

The present disclosure relates to systems, methods and apparatus for the securement, tracking, and verification of items including, but not limited to, evidence, products, or other inventory items.

BACKGROUND

The current technology of evidence tracking, such as in criminal investigations, involves storing evidence within paper bags, securing the paper bags with tamper evident evidence tape, and storing the thus secured evidence within an evidence room. However, such paper bags and tape typically degrade quickly. When stored evidence is compromised due to such degradation, doubt may arise as to whether the evidence bag was breached due to environmental conditions or as a result of nefarious activities. As such, the chain of custody of the evidence may be compromised, potentially destroying the value of the evidence.

Agencies, such as police departments, typically hand write case numbers on evidence bags or place bar code stickers on the paper bags to identify the contents of the bag. However, such hand-written transcriptions allow for human error or mishandling, in addition to the risk of the stickers falling off of the bag and being reassigned to the wrong bag.

BRIEF SUMMARY

One aspect of the present disclosure includes a tracking system. The system includes a wireless tracker, including a machine-readable identification and an antenna configured to receive and transmit wireless signals. The system includes a fastener, including a machine-readable identification. The system includes a container configured to receive and contain items. The fastener is configured to couple with the wireless tracker and the container, such that the fastener secures with the wireless tracker, secures the wireless tracker to the container, and secures the container in a closed configuration.

Another embodiment of the present disclosure includes a method of tracking items. The method includes scanning machine-readable identifications on both a fastener and a wireless tracker; and generating a blockchain hash (also referred to as a security blockchain hash) in a management software using the scanned machine-readable identifications on both the fastener and the wireless tracker. The method includes assigning the generated blockchain hash to physical item(s), and placing the physical item(s) within a container. The method includes coupling the fastener with the wireless tracker and with the container, such that the fastener secures the wireless tracker to the container and secures the container in a closed configuration with the physical items contained within the container. The method includes monitoring wireless signals emitted from the wireless tracker.

Another embodiment of the present disclosure includes a wireless item tracker that includes a body, a machine-readable identification on or in the body, and an antenna on or in the body. The antenna is configured to receive and transmit wireless signals. The body is configured to be coupled with a fastener and a bag.

Another embodiment of the present disclosure includes a fastener for coupling a wireless item tracker to a bag. The fastener includes a body, including a strap coupled with a locking structure; a machine-readable identification in or on the body; and a human-readable identification in or on the body. The machine-readable identification and the human-readable identification are linked.

Another embodiment of the present disclosure includes a container. The container includes a body, and a cavity at least partially defined by the body. The cavity is configured to receive items when the container is in an open configuration, and the cavity is configured to contain when the container is in a closed configuration.

Another embodiment of the present disclosure includes an item management system that includes item management software stored on a computer and in data communication with a plurality of wireless trackers. The management software is stored in non-transitory computer readable medium of the computer. The management software is configured to receive and store wireless signals from the plurality of wireless trackers.

BRIEF DESCRIPTION OF THE DRAWINGS

So that the manner in which the features and advantages of the systems, apparatus, and/or methods of the present disclosure may be understood in more detail, a more particular description briefly summarized above may be had by reference to the embodiments thereof which are illustrated in the appended drawings that form a part of this specification. It is to be noted, however, that the drawings illustrate only various exemplary embodiments and are therefore not to be considered limiting of the disclosed concepts as it may include other effective embodiments as well.

FIG. 1A is a side view of a zip tie;
FIG. 1B is a bottom view of a zip tie;
FIG. 2A is a top view of zip tie;
FIG. 2B is a top view of an alternative embodiment of a zip tie;
FIG. 3 is a bottom view of a zip tie;
FIG. 16 is a schematic of a facility for tracking items;
and
FIG. 17 is a simplified schematic of a wire coupled with an RFID tag for monitoring of a container.

Figure 4:
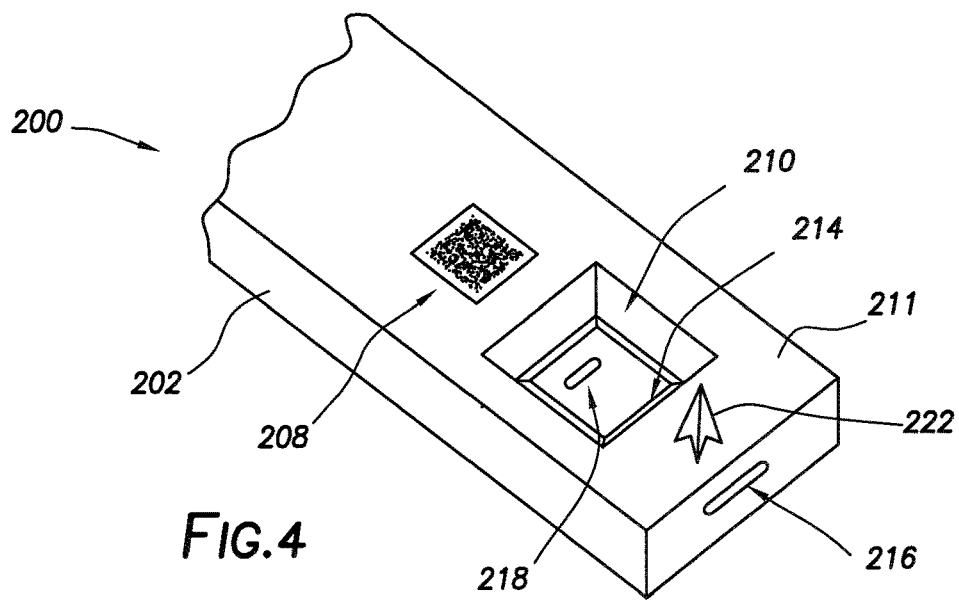
FIG. 4 is a bottom view of an RFID tag.

Systems, apparatus, and methods according to present disclosure will now be described more fully with reference to the accompanying drawings, which illustrate various exemplary embodiments. Concepts according to the present disclosure may, however, be embodied in many different forms and should not be construed as being limited by the illustrated embodiments set forth herein. Rather, these embodiments are provided so that this disclosure will be thorough as well as complete and will fully convey the scope of the various concepts to those skilled in the art and the best and preferred modes of practice.

DETAILED DESCRIPTION

Certain aspects of the present disclosure include tracking systems and methods for securing items, tracking and monitoring items, and ensuring a verifiable chain of custody thereof. The items may be evidence in a criminal, civil, or other investigation; inventory items, such as corporate products; or other items. In some aspects, the system includes a wireless tracking device (e.g., a radio frequency identification (RFID) tag), a fastener (e.g., a zip tie), a container (e.g., a bag), or combinations thereof. Each of the wireless tracking device (also referred to herein as a "wireless tracker"), the fastener, and the container may be a separate structure, and each of these separate structures may be selectively coupled and decoupled to selectively form an assembly thereof (also referred to as a "tracking assembly" or an "evidence tracking assembly"). Exemplary embodiments of each these structures will now be briefly described prior to discussing the combination thereof into a system or assembly.

Fastener

The tracking system (in some embodiments an "evidence tracking system") disclosed herein may include a fastener. The fastener may be any fastener, or other structure or apparatus, that is capable of coupling with and securing to the wireless tracking device disclosed herein, coupling with and securing to the container (in some embodiments an "evidence container" or "evidence bag") disclosed herein, or combinations thereof. In some embodiments, the fastener is a structure capable of coupling with and securing to the container, such that the fastener secures and/or seals the container into a closed configuration. In some embodiments, the fastener is any structure or apparatus that is capable of simultaneously coupling with and securing to the wireless tracking device and the container, such that a tracking assembly (in some embodiments "an evidence tracking assembly") is formed. In some such embodiments, the tracking assembly includes the fastener coupled with the wireless tracking device and coupled about the container, such that the fastener secures the container into a closed configuration and secures the wireless tracking device to both the container and the fastener.

In some aspects, the fastener is capable of entering at least two different configurations, including an open, unlocked, or unfastened configuration, and a closed, locked, or fastened configuration. For example, the fastener may be a self-locking device, such that one portion of the fastener engages with another portion of the fastener to close, lock, or fasten the fastener. In some aspects, the fastener is irreversibly securable, such that once the fastener is in the closed, locked, or fastened configuration, the fastener cannot return to the open, unlocked, or unfastened configuration without destroying or otherwise rendering the fastener unusable. In other aspects, the fastener is reversibly securable, such that the fastener may be unfastened and then re-fastened.

The fastener may be or include a strap, band, loop, or other structure, and may include an integrated locking and/or ratcheting structure thereon for closing, locking, and/or fastening the fastener. One exemplary structure suitable for use as the fastener is a zip tie, also referred to as a cable tie, wire tie, hose tie, steggel tie, or zap strap. However, the fastener is not limited to these particular structures.

With reference to FIGS. 1A-3, various exemplary fasteners are depicted in an open and unlocked configuration, here shown in the form of a zip tie. Fastener 100 includes integrated locking structure 102 (also referred to as a "base"). Fastener 100 also includes strap 106 extending from side 103 of locking structure 102. Strap 106 includes first end 105 at the connection between strap 106 and side 103, and second end 104 (also referred to as a "tip") at the opposite end of strap 106.

Locking structure 102 includes and/or defines channel 108 (also referred to as "zip tie channel"), which is a cavity extending from bottom side 109 to top side 111 of locking structure 102. Channel 108 is configured (i.e., sized, shaped, positioned, and/or arranged) to receive strap 106. That is, second end 104 of strap 106 may enter channel 108 from bottom side 109, pass through channel 108, and exit channel 108 from top side 111. Locking structure 102 includes ratcheting member 113 positioned within or relative to channel 108, such that as strap 106 passes through channel 108, ratcheting member 113 ratchetedly engages with strap 106. Strap 106 includes ratchet teeth 115 which sequentially engage with ratcheting member 113 as strap 106 passes through channel 108; thereby, ratchetedly locking a position of strap 106 within channel 108. As such, strap 106 may be coupled with locking structure 102 to secure fastener 100. Locking structure 102 is not limited to including a channel or cavity with a ratcheting member, and may be or include any structure capable of engaging with and securing strap 106 or another portion of fastener 100.

Fastener 100 includes machine readable identification 110 (e.g., optically readable identification). Machine readable identification 110 may be printed onto, embedded into, engraved on, or otherwise positioned on a surface or other portion of fastener 100. As shown in FIG. 2, machine readable identification 110 is a Quick Response (QR) code that is positioned on bottom side 109 of locking structure 102. However, machine readable identification 110 is not limited to being positioned on bottom side 109 of locking structure 102. Furthermore, machine readable identification 110 is not limited to being a QR code, and may be another form of identification that is machine readable (e.g., is optically scannable), such as a bar code.

In some embodiments, machine readable identification 110 is a QR code that is printed or engraved directly onto fastener 100 or is printed or engraved onto a plate of steel or other material that is embedded within fastener 100 (e.g., a laser engraved QR code). In some aspects, machine readable identification 110 is on a tag 297 that is coupled with a portion of fastener 100, such as locking structure 102, and extends therefrom. Tag 297 may be removable from fastener 100. Tab 297 may be, for example, a plastic tab.

Fastener 100 may include a visually, human-readable identification, such as a code of numbers, letters, other symbols, or combinations thereof (e.g., an alphanumeric code). Fastener 100 includes identification code 112, here shown as a numeric ID, that is printed or engraved onto strap 106 or another portion of fastener 100, or is printed or engraved onto a plate of steel or other material that is embedded within strap 106 or another portion of fastener 100. In some aspects, identification code 112 is positioned on or proximate second end 104. However, the identification codes disclosed herein may be positioned at other locations on or in fastener 100. Identification code 112 may be any code of numbers, letters, symbols, shapes, or other human-readable indicia that may serve as a visual identifier, such as for an evidence manager or inventory manager to read.

Identification code 112 is linked with and corresponds with machine readable identification 110. For example, identification code 112 may be the same as machine-readable identification 110, such as where the identification code is "ABC123" and the machine-readable identification, when scanned, is "ABC123". In other aspects, identification code 112 is not the same as machine-readable identification 110, but is linked therewith. Regardless, identification code 112 and machine-readable identification 110 are linked and/or corresponded such that a user is capable of reading identification code 112 and scanning machine-readable identification 110 to confirm that the two are a match. In some embodiments, the visually, human-readable identification is not hand written.

Wireless Tracking Device

The tracking system disclosed herein may include a wireless tracking device. The wireless tracking device may be any device capable of receiving and/or emitting wireless signals. For example, the wireless tracking device may receive and/or emit radio frequency signals, BLUETOOTH® signals, WI-FI™ signals, cellular signals, satellite communication signals, or other electromagnetic radiation-based wireless signals. In some aspects, the wireless tracking device constantly or intermittently receives and/or transmits wirelesses signals. The signals received by the wireless tracking device may be requests for location-based data, such as a request for a global positioning satellite (GPS) location. The signals transmitted by the wireless tracking device may be transmissions of location-based data, such as a GPS location of the wireless tracking device. As such, the location of the wireless tracking device, and anything coupled therewith, may be tracked, constantly or intermittently.

Figure 7:
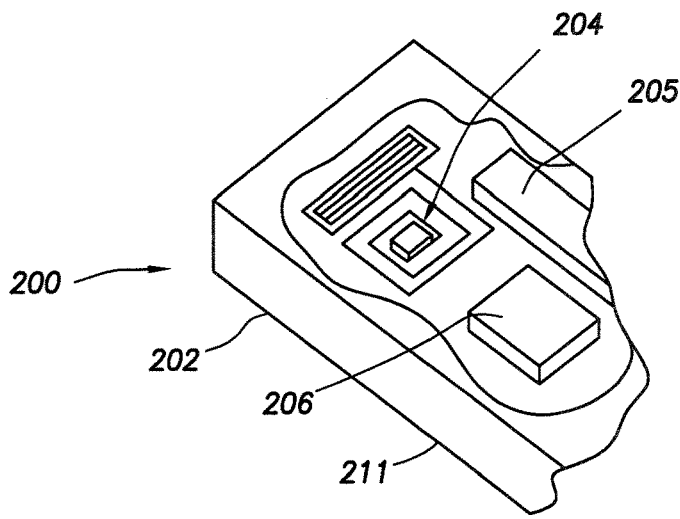
FIG. 7 is view of internal components of an RFID tag.

With reference to FIGS. 4-7, an exemplary wireless tracking device 200 is depicted, here shown as an RFID tag. Wireless tracking device 200 includes body 202. In FIG. 7, a portion of body 202 is broken away such that the internal circuitry thereof is viewable. Wireless tracking device 200 includes antenna 204, here an RFID antenna, positioned within body 202 for receipt and transmission of wireless signals.

In some embodiments, wireless tracking device 200 is an active wireless tracking device, such as an active RFID tag, that includes active circuitry 205 and battery 206, which may be contained within body 202 and be in electrical and/or data communication with antenna 204. Active wireless tracking devices are powered by internal battery 206 or by an external power source. Active wireless tracking devices may require replacement upon depletion of battery 206, which may be dependent upon the transmission requirements. Active wireless tracking devices may also be fitted with LED lights, speakers, GPS, temperature sensors, or other sensors depending on the particular application.

In other embodiments, the wireless tracking devices disclosed herein are passive, and include no battery. Passive wireless tracking devices may be powered via electromagnetic charge from a signal reader/scanner (e.g., powered via radio signals). Some passive wireless tracking devices have an operational shelf life of up to 30 years, or even longer.

Cavity 210 is formed into body 202 on bottom side 211 thereof. Cavity 210 may be configured (e.g., sized, shaped, positioned, and/or arranged) to receive, engage with, and/or secure to a portion of fastener 100, such as locking structure 102. As shown and described in more detail below, locking structure 102 may fit within cavity 210 for engagement between locking structure 102 and cavity 210.

Channel 201 (also referred to as a "first RFID tag channel") is formed within body 202, and includes channel entrance 214 and channel exit 216. Channel 203 (also referred to as a "second RFID tag channel") is formed within body 202, and includes channel entrance 218 and channel exit 220. Channels 201 and 203 are configured (sized, shaped, positioned, and/or arranged) to receive a portion of fastener 100, such as strap 106. As such, fastener 100 may be coupled with and/or through wireless tracking device 200, as described in more detail below.

Wireless tracking device 200 includes container fastener 222 configured (sized, shaped, positioned, and/or arranged) for attachment with the container disclosed herein. In some embodiments, container fastener 222 is a security spike positioned on and extending from bottom side 211 of wireless tracking device 200.

Wireless tracking device 200 may include raised portion 224 positioned opposite cavity 210. Raised portion is on top side 213 and extends therefrom. Raised portion 224 provides space within body 202 to accommodate locking structure 102 or another portion of fastener 100 within cavity 210. In some aspects, channel 203 is at least partially formed through raised portion 224.

Wireless tracking device 200 includes light emitting diode (LED) 230. In embodiments of wireless tracking device 200 that include battery 206, LED 230 may be coupled therewith such that the battery provides power to the LED 230. Also, LED 230 is coupled with circuitry 205 for receiving control commands therefrom (e.g., control commands to turn on or off). In some embodiments, an LED, the same or similar to LED 230, may be included in a passive wireless tracking device, which may be powered by emissions of high power, low frequency emissions, without requiring a battery.

Wireless tracking device 200 includes machine readable identification 208 (e.g., optically readable). Machine readable identification 208 may be the same or substantially similar to machine readable identification 110 on fastener 100. Machine readable identification 208 may be printed onto, embedded into, engraved on, or otherwise positioned on a surface or other portion of wireless tracking device 200. As shown in FIG. 4, machine readable identification 208 is a Quick Response (QR) code that is positioned on bottom side 211. However, machine readable identification 208 is not limited to being positioned on bottom side 211. Furthermore, machine readable identification 208 is not limited to being a QR code, and may be another form of identification that is machine readable (e.g., is optically scannable), such as a bar code. In some embodiments, machine readable identification 208 is a QR code that is printed directly onto wireless tracking device 200 or is engraved onto a plate of steel or other material that is embedded within wireless tracking device 200 (e.g., a laser engraved QR code).

Figures 5, 6:
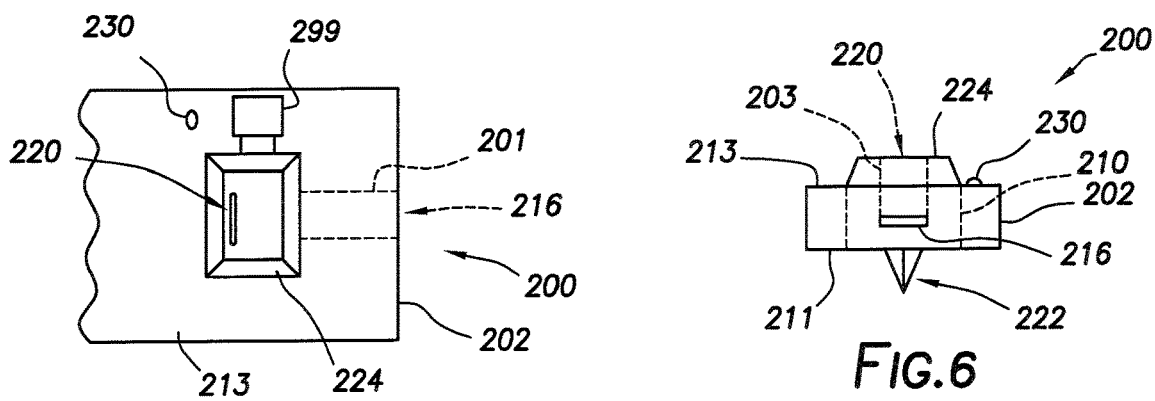
FIG. 5 is a top view of an RFID tag.
FIG. 6 is an end view of an RFID tag.

The RFID chips may be of various sizes, depending on minimum data and ECM requirements for the software. Some exemplary RFID chips include 128 KB RFID chips and 512 KB RFID chips. Replacement of an existing RFID tags with new RFID tags may easily occur and may be updated into the system. The use of a separate zip tie allows for the reuse of the RFID tag following each authorized or unauthorized breach, replacing only the less expensive zip tie rather than the entire device. While the systems and methods described herein discuss the use of RFID and QR Code technology, the systems and methods are not limited to the use of these particular technologies, and may utilize other scannable media and/or other communication technologies (e.g., IoT, NFC). In some aspects, the wireless tracking devices disclosed herein work with and/or are compatible with NFC, IoT, Bluetooth, pressure sensors, temperature sensors, weight sensitive shelving, and other components. For example, FIG. 5 depicts temperature sensor 299 on wireless tracker 200. Temperature sensor 299 may monitor variances in the temperature of or proximate wireless tracker 200 to provide warning for the overheating of items contained within an associated container (e.g., if lithium or other batteries or electronics overheat), and to provide warning prior to the occurrence of a fire. In some such embodiments, the use of a temperature sensor reduces or eliminates the need and associated expense for using a fire-resistant material to construct the container, such as NOMEX™.

Wireless Tracking Device and Fastener—Assembly

Figure 8:
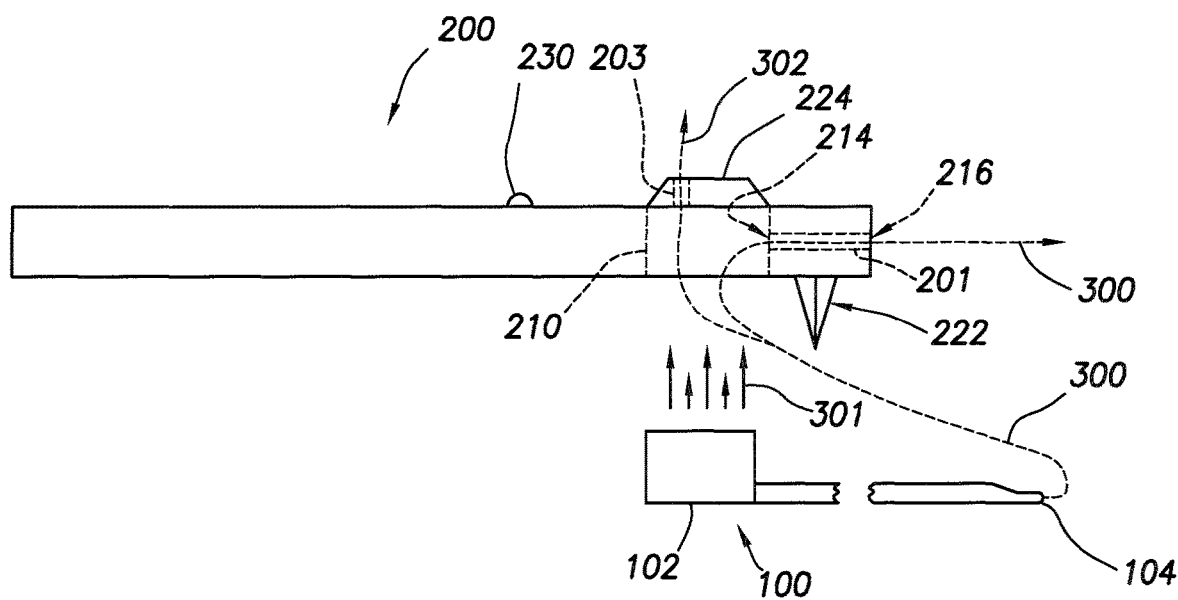
FIG. 8 is a side view of an RFID tag and zip tie, decoupled.
Figure 9:
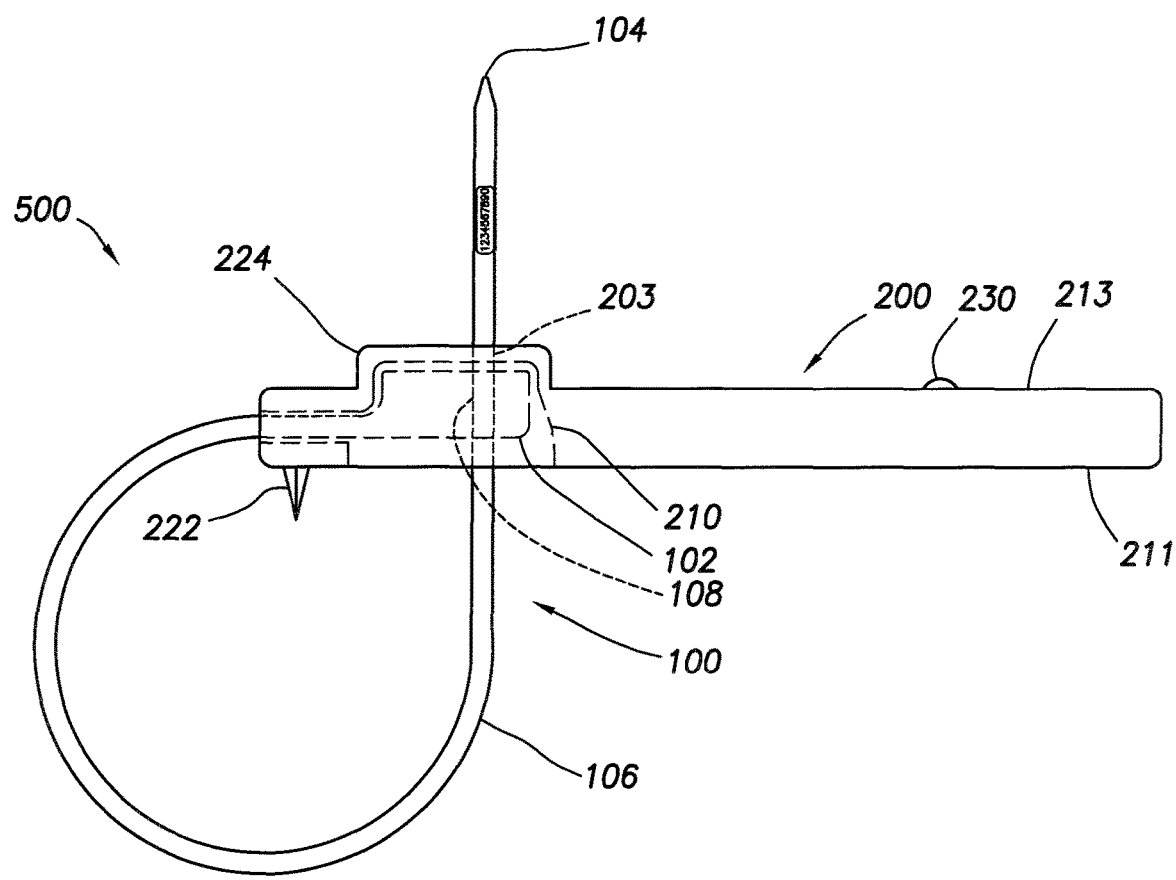
FIG. 9 is a side view of an RFID tag and zip tie, coupled.
Figure 10:
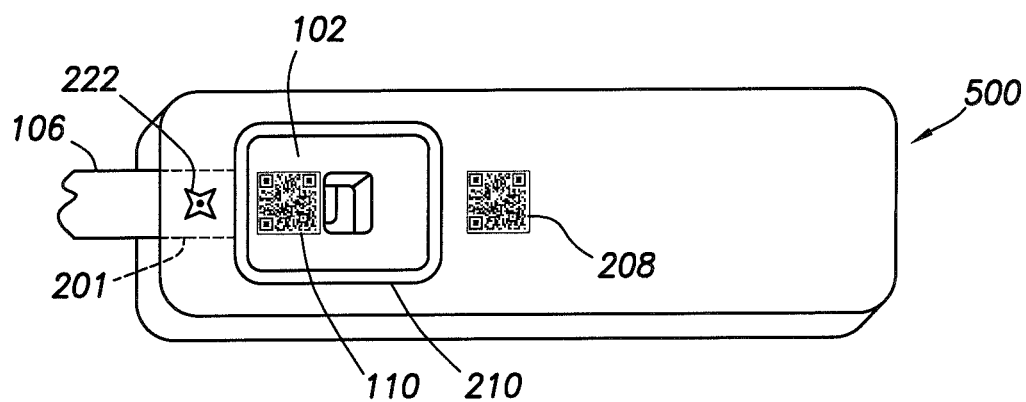
FIG. 10 is a bottom view of an RFID tag and zip tie, coupled.

With reference to FIGS. 8-10, the coupling of fastener 100 with wireless tracking device 200 is illustrated. To couple fastener 100 with wireless tracking device 200, second end 104 is inserted into channel entrance 214, and passes through first channel 201, as indicated via line 300. Locking structure 102 is then inserted into cavity 210, as indicated via lines 301. With locking structure 102 in cavity 210, second end 104 is inserted into and through channel 108, and into and through second channel 203, as indicated via line 302, forming wireless tracking device and fastener assembly or system 500.

As such, fastener 100 may be inserted into the wireless tracking device 200 (which may be a plastic, sealed unit) by sliding second end 104 into cavity 210 and into the channels (or slots) formed on the underside of wireless tracking device 200. Locking structure 102 is configured to fit securely into cavity 210. Thus, fastener 100 is coupled with wireless tracking device 200 in such a manner that fastener 100 is inseparable from wireless tracking device 200 without breaking fastener 100.

Container

Figure 11:
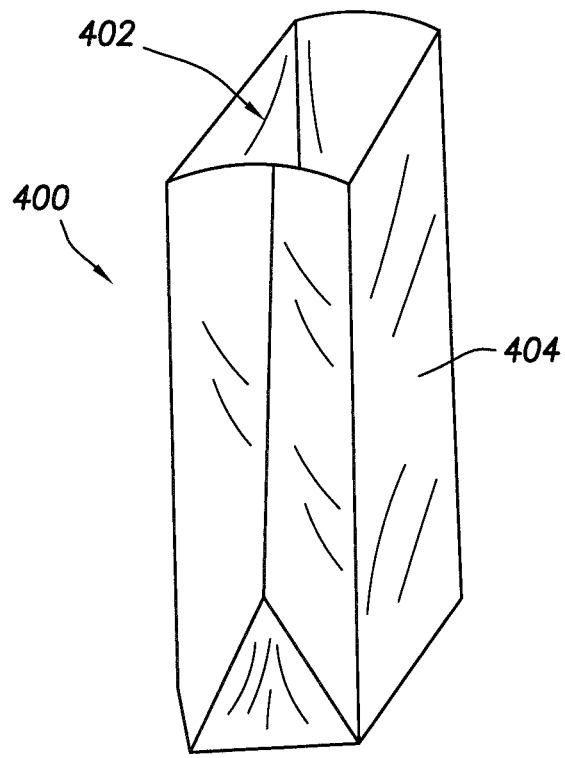
FIG. 11 is a bag in an open configuration.

The tracking system disclosed herein may include a container (in some embodiments "an evidence container"). In some such aspects, the container is a bag (in some embodiments "an evidence bag"). With reference to FIG. 11, an exemplary container 400 (here shown as a bag) is depicted in an open configuration. Container 400 may be a non-transparent bag or other container. Container 400 may be any of various sizes, shapes, or colors. In some aspects, the size, shape, and/or color of container 400 is selected to be associated with the contents thereof, such that the size, shape, and/or color of container 400 is visually indicative of the contents of container 400. For example, a red bag may be indicative of a bag that contains biohazardous materials.

Container 400 may be or include a bio-degradable fibrous weave, NOMEX™ or a NOMEX™-based fabric, nylon, or another natural or synthetic fabric. In some aspects, container 400 is or includes a water-proof or water-resistant material, a fire-proof or fire-resistant material, a mold-proof or mold-resistant material, or combinations thereof. In some aspects, container 400 is or includes a fiber-based material that does not include plastic, paper, or both plastic and paper. In some aspects, container 400 is not airtight, and is breathable (i.e., permeable to air or other gas).

Container 400 may be or include a wire mesh material (e.g., microwire) that is woven through at least a portion of the material of container 400. The wire mesh material may be capable of interacting with an active wireless tracking device 200 (e.g., an active RFID tag) to facilitate the identification of and alert of the occurrence of a breach of container 400. In some aspects, container 400 does not have a serial number or individual identifier thereon, and is only identifiable via an attached RFID tag.

Figure 12:
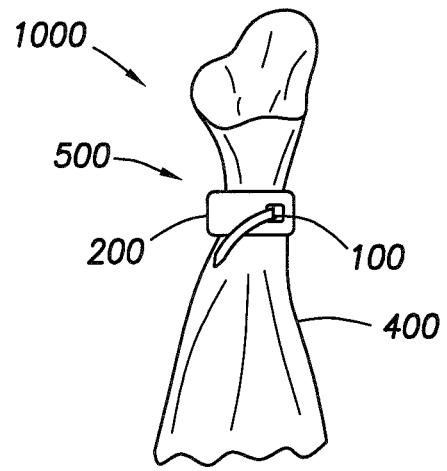
FIG. 12 is a bag in a closed configuration, secured with a zip tie and RFID tag.

Container 400 includes body 404, which may be composed of any of the materials discussed herein. Body 404 defines container cavity 402. In use, evidence or other items may be placed into container cavity 402. After evidence is, or other items are, within container cavity 402, container 400 may be closed, as shown in FIG. 12, to secure and contain the evidence or items within container cavity 402.

While not shown, in some embodiments a micro wire may be incorporated into the bag and configured to detect a breach via changes in resistance when used in conjunction with an active RFID unit or other wireless tracking device.

Tracking Systems and Assemblies

Some aspects of the present disclosure include a tracking system or assembly (in some embodiments "an evidence tracking system or assembly"), which includes the fastener 100, wireless tracking device 200, container 400, or combinations thereof. In some such aspects, the tracking system is a three-part system, where each of the fastener 100, wireless tracking device 200, and container 400 is a separate part of the three-part system or assembly.

With reference to FIG. 12, an exemplary tracking system (or assembly) 1000 is depicted, including container 400, fastener 100, and wireless tracking device 200. As shown, container 400 is secured in a closed configuration. Fastener 100 is secured to wireless tracking device 200, as shown and described with reference to FIGS. 8-10. Also, fastener 100 is tightened and secured about container 400, such that cavity 402 of container 400 is no longer opened, but is closed.

While wireless tracking device 200, fastener 100, and container 400 are described herein as being used in conjunction with one another, the systems and methods disclosed herein are not limited to using wireless tracking device 200, fastener 100, and container 400 together. In some aspects, wireless tracking device 200 and container 400 are used with a standard zip tie that lacks the QR Code (or other machine-readable code) and other features of fastener 100. In other aspects, wireless tracking device 200 and fastener 100 are used in conjunction to secure a bag or container that is different than those disclosed herein, or to secure and/or track another object that is not a container. Thus, wireless tracking device 200, fastener 100, and container 400 may be used separately from one another, or in any combination.

Methods of Tracking and Use of Tracking Systems

Figure 13:
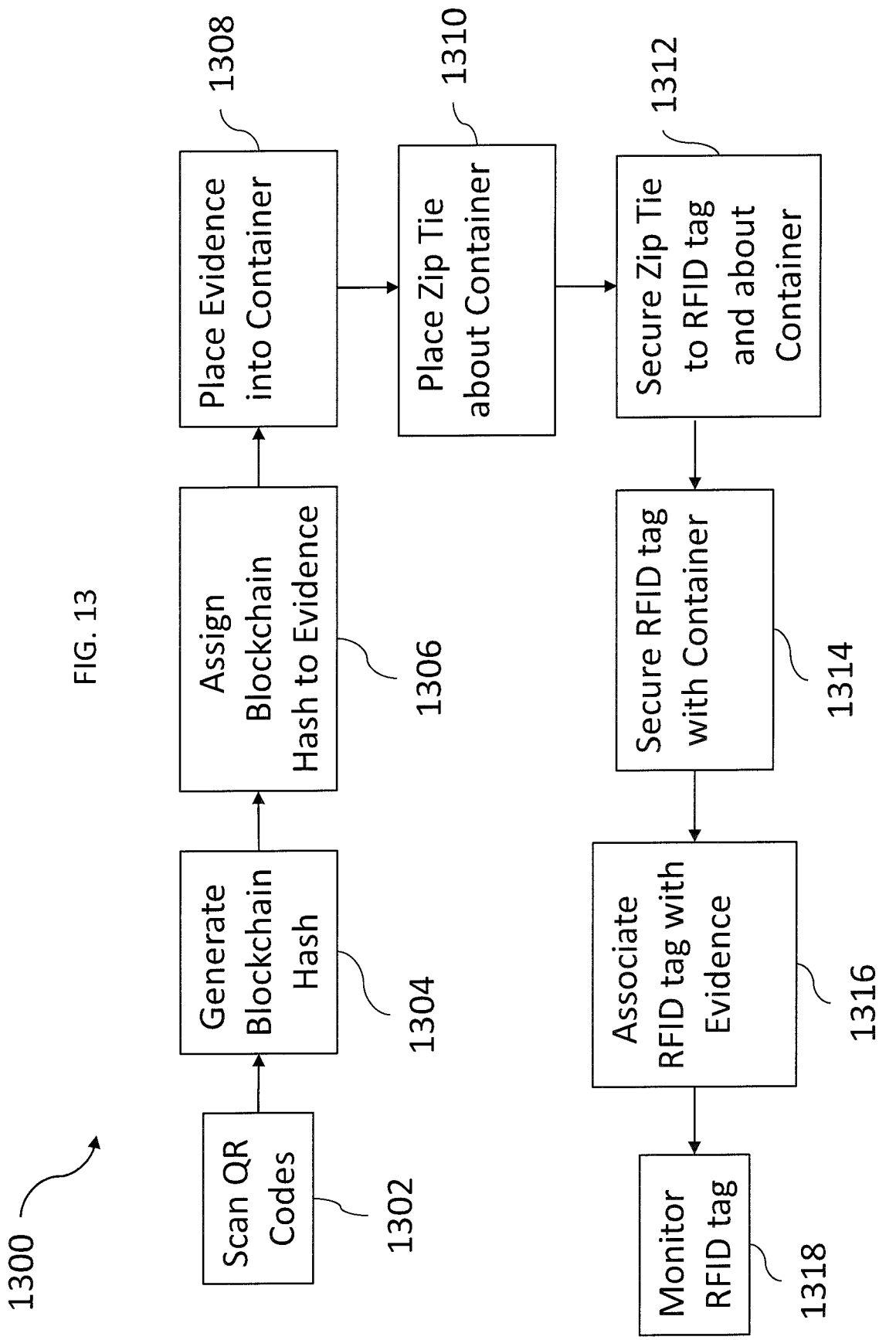
FIG. 13 is a schematic of a method of tracking items that have been secured using the methods described herein.

Some aspects of the present disclosure include tracking systems and methods that utilize blockchain software and computer technology. An exemplary method is described with reference to FIG. 13, tracking method 1300. The machine-readable identifications on the wireless tracking device and the fastener are scanned or otherwise read via machine, box 1302. For example, the machine-readable identifications may be scanned using a computer tablet or other computer or hand-held scanner or other machine capable of optically or otherwise reading the machine-readable identifications. While tracking method 1300 is described with respect to the tracking of evidence, the method may be applied in the same or substantially the same manner to track other items (e.g., corporate inventory items).

The scanning of machine-readable identifications results in the generation of a blockchain hash, box 1304. The blockchain hash (security blockchain hash) may be generated in response to receipt of the scanned machine-readable identifications via a management software into which the scanned machine-readable identifications are input as a result of the scanning. In this embodiment, the management software is an evidence management software for tracking evidence. However, the same or substantially similar software may be used to track other items. For example, the evidence management software may be a software that is resident on the device used to scan the machine-readable identifications, or on a device in data communication with the device used to scan the machine-readable identifications. The evidence management software may include computer instructions to generate the blockchain hash upon receipt of the scanned machine-readable identifications.

The thusly generated blockchain hash may then be assigned to one or more evidence items intended to be contained within an associated evidence container, box 1306. Assignment of the first blockchain hash to one or more evidence items may be performed automatically via the evidence management software, such as via assignment to evidence from within a queue of evidence stored within the evidence management software. Assignment of the blockchain hash to one or more evidence items may be performed manually, such as via a user imputing an identity of the evidence into the evidence management software, such that the identity of the evidence is linked with the blockchain hash within the evidence management software. The evidence may include photographic images, recordings, and other electronic data associated with the contents of the evidence container, which are assigned to the generated blockchain hash.

The items of evidence are then placed in the evidence container, box 1308. For example, the evidence may be placed into the cavity of the evidence container.

The fastener may then be secured and tightened about the evidence container, box 1310. For example, a zip tie embodiment of the fastener may be wrapped once around the opening of the evidence container, above the evidence contained therein.

The fastener may then be secured with the wireless tracking device, box 1312. For example, a zip tie embodiment of the fastener may be secured with the wireless tracking device in the same or similar manner as shown in FIGS. 8-10, with the zip tie being pulled until the zip tie is pulled tightly about the evidence container to secure the evidence container in a closed configuration.

The wireless tracking device may then be secured or fastened with the evidence container, box 1314. For example, a security spike on the underside of the wireless tracking device may be embed into the material of the evidence container. With the wireless tracking device secured or fastened with the evidence container, the fastener and the wireless tracking device are prevented from being pulled or otherwise removed from the evidence container without cutting or otherwise destroying the fastener or the evidence container. The security spike is embedded into the fabric of the container in a location that is directly in-line with the zip tie or other fastener, and under the RFID tag or other tracking device. Thus, when the zip tie or other fastener is tightened to the furthest point, the security spike is embedded in the fabric of the container, preventing an individual from removing the previously attached zip tie and RFID tag from the container bag without causing severe recognizable damage to the container, and possibly to the security spike. Once the zip tie has been inserted into the RFID tag or other tracking device and secured thereto, the opening circumference of the zip tie can only become smaller. Due to the mass of uncompressed fabric on both sides of the tightened zip tie and the presence of the security spike embedded in the compressed fabric, the container will not be easily removed or re-inserted without causing significant damage to the container or security spike. By instructing users of the system, via training and written documentation for use, to first "twist" or "spin" the opening of the container prior to sealing it with the tightened zip tie and RFID tag, the twisting of the material will create further compression of the fabric; thus, increasing the securing of the container through additional reduction in the circumference of the tightened and secured zip tie and increased density of the material at the location where the security spike will be embedded upon tightening. Thus, the only way to gain authorized access to the contents of the container is by cutting the zip tie. Such action may be prompted by the management software upon authorized access to the contents of the container. The management software may require the QR Code of the cut zip tie and the existing RFID tag to once again be scanned and verified against the former scan and block chain hash. The management software may then require, prior to re-securing the container, that a new zip tie be inserted into the original RFID tag and that the new zip tie QR Code be "married" to the QR Code of the existing RFID tag; thus, updating the associated blockchain.

In some embodiments, the method includes coupling each independent item of evidence (or other item) that is placed into the evidence container with a separate RFID chip. That is, in addition to the RFID tag that is coupled with the fastener about the evidence container, additional RFID tags may be coupled with each item of evidence that is placed in the evidence container. Such additional RFID tags may be coupled with the items of evidence via applying adhesive stickers that include an RFID tag onto the evidence, placing the evidence in envelopes that contain an RFID tag, or placing the evidence in a container with an embedded RFID chip. In such embodiments, each RFID tag of each item of evidence is scanned with the same primary device used for the RFID tag of the evidence container. Such embodiments allow for the confirmation of each individual item of evidence every time that the evidence container is opened or secured. Such embodiments also allow for the separation of particular items of evidence, such as for transport for testing, destruction, or other requirements, without having to transport all of the items together within the main evidence container. Each individual RFID tag or chip will generate an additional hash in the blockchain that will be added to the blockchain associated with the evidence container RFID tag and fastener. Thus, a blockchain hash may be created for every item of evidence, and such hashes are associated with the blockchain hash of the evidence container. As law enforcement officers, or other users, come into contact with the evidence and evidence container before it is secured, generating a hash of the item on first contact provides the ability to track each item from the time of first contact with that item.

With the evidence container secured in a closed configuration, a program option may be selected in the management software to program a computer chip (e.g., circuitry 205) embedded in the wireless tracking device to be associated with the evidence contained within the evidence container, box 1316. The computer chip is, thus, also associated with the scanned machine-readable identifications already linked to the evidence within the evidence management software.

The computer chip of the wireless tracking device may then serve as the primary identifier for the evidence contained within the evidence container. As such, all child hashes (hashes of individual evidence items) are tracked and linked to the RFID computer chip of the wireless tracking device of the container, such that the RFID of the container serves as the primary identifier for all evidence therein. Using near-field communication (NFC) technology, the wireless tracking device may be passively or actively monitored using secondary readers, transmitters, computer tablets, or other such devices, box 1318.

In embodiments where the evidence container is opaque, it will not be possible to visually identify the contents of the evidence container without opening the evidence container. As such, if an evidence container is breached and the contents are removed therefrom, the evidence management software that is monitoring the wireless tracking device and blockchain record thereof will identify the party that used the software to identify the evidence container and the location of the evidence container.

In embodiments where an active wireless tracking device (e.g., an active RFID tag) is used, utilizing an onboard battery and chipset, an LED light flashes upon command, allowing the associated evidence container to be more easily visually located, as well as to utilize additional technology, such as IoT (Internet of Things) and other sensors. For example, a user may select an option within the evidence management software on a tablet computer (or other device) to flash the LED light such that the use may identify the location of the evidence container. The wireless tracking device is not limited to including a LED light for providing a signal. In some aspects, the wireless tracking device includes a light for providing a visible signal, a speaker for providing an audible signal, a vibrating mechanism for providing a tactile signal, or combinations thereof. Thus, the wireless tracking device may include a signaling device that is a visible signaling device, an audible signaling device, a tactile signaling device, or combinations thereof.

After the secured evidence container is opened, such as by cutting a zip tie securing the evidence container, the cut zip tie may be removed and the wireless tracking device may be reassigned to a new zip tie and/or evidence item.

The blockchain history will track a permanent record of all wireless tracking device activity and interaction, providing a full chain of custody stored within the evidence management software. The blockchain history may track: (1) the physical location of the wireless tracking device; (2) the identity of user accounts that access the case file in the evidence management software that is linked with the wireless tracking device; (3) the times and dates when the case file in the evidence management software, that is linked with the wireless tracking device, is accessed; (4) the devices (e.g., computer tablets or hand-held scanners) used to access the case file in the evidence management software that is linked with the wireless tracking device; and (5) any other activities where the wireless tracking device receives or transmits signals and where the case file in the evidence management software that is linked with the wireless tracking device is accessed or modified.

Management Software, Blockchains, and Hash Values

Some aspects of the present disclosure include software for use in the tracking of evidence or other items, including, but not limited to, the use of such software in conjunction with one or more of the systems, apparatus, and methods disclosed herein. The software may be stored on a non-transitory storage medium, including any of a variety of data storage such as hard drives and solid-state drives.

Figure 14:
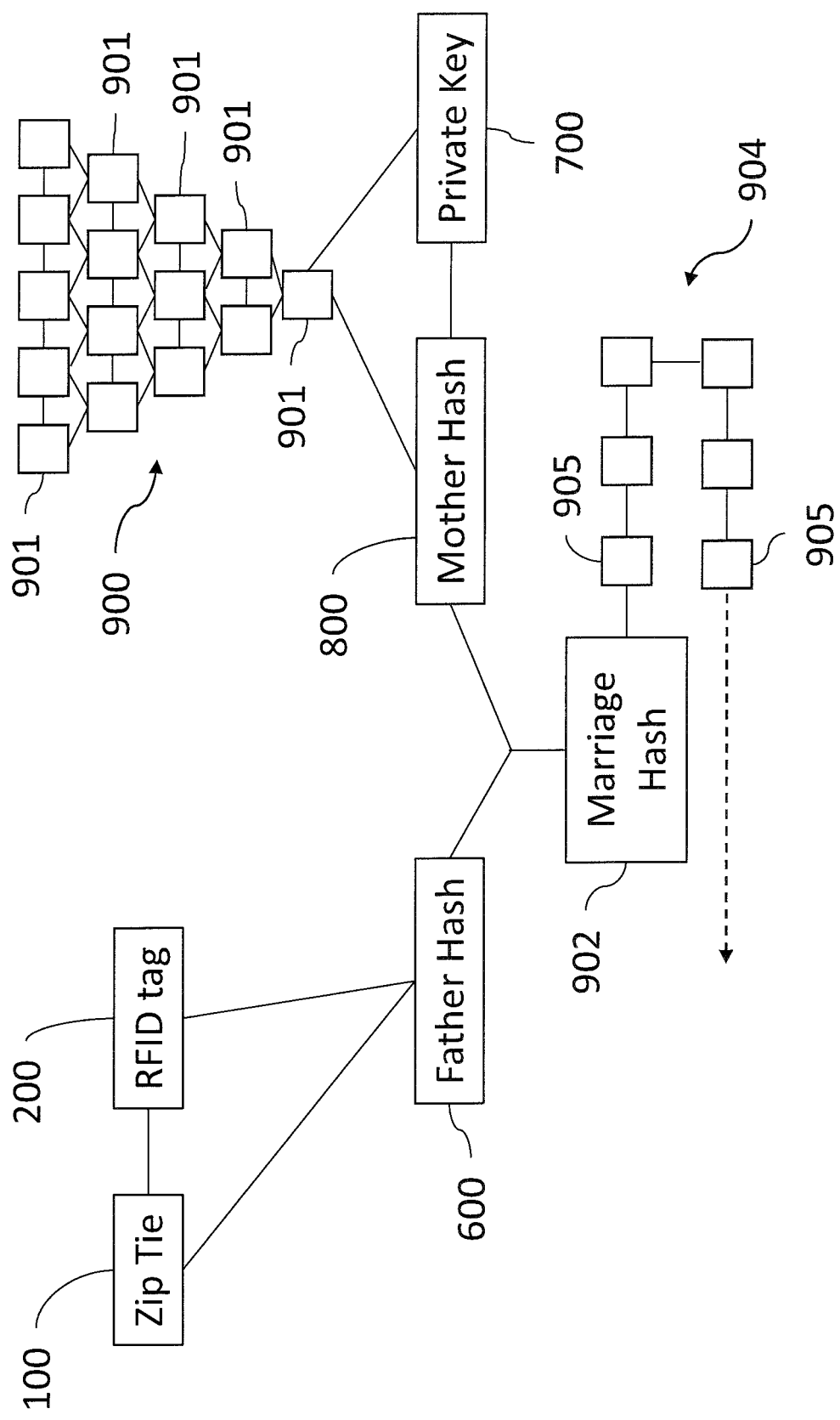
FIG. 14 is a schematic of a management system.

With reference to FIG. 14, the operation and use of one exemplary evidence management software system is described in association with fastener 100 and wireless tracking device 200. While described with respect to evidence, one skilled in the art would understand that the management software system described with reference to FIG. 14 may be used to track other items in the same or substantially the same manner.

The machine-readable identification for fastener 100 and wireless tracking device 200 are scanned and input into the evidence management software. The machine-readable identification for fastener 100 may be or include an identifying code and be linked with information regarding fastener 100, such as the size, manufacturer, and other information. The machine-readable identification wireless tracking device 200 may be or include an identifying code and be linked with information regarding wireless tracking device 200, such as whether wireless tracking device 200 is passive or active, the company/owner associated with wireless tracking device 200, the location of wireless tracking device 200, hazardous material information, manufacturer information, and other information.

Evidence management software includes computer instructions to join the scanned/input machine-readable identifications of fastener 100 and wireless tracking device 200 into a combined hash, also referred to as "father hash" 600. For example, when both machine-readable identifications are scanned (e.g., sequentially scanned), the evidence management software connects and links the two machine-readable identifications, forming a data-link or association therebetween. Hash 600 may be generated by evidence management software stored on the device that scanned the machine-readable identifications, such as a computer tablet, mobile phone, or other handheld scanner. For example, the evidence management software, or a component or version thereof, may be stored on the scanning device, such as in the form of a mobile "App". The scanning and joining of the two machine-readable identifiers to generate hash 600 may occur before, upon, or after the placement of physical or other evidence within an evidence container, and the joining of the zip tie or other device with the RFID tag or other device.

Stored within the scanning device and/or within a computer or computers that is or are in data communication with the scanning device is a data file, combined data 900, that includes a plurality of data 901. In some aspects, communication between devices is performed using an Interplanetary file system (IPFS). Data 901 may be or include, for example and without limitation, any of various software-based files (e.g., .doc, .pdf, .xls, .jpg or other file types) or hash data. Each portion of data 901 may be linked to other portions of data 901 within the same combined file 900. Each combined file 900 may be associated with a single or multiple evidence bag that contains evidence. The data 901 within combined data 900 may be or include evidence (e.g., electronic/digital file evidence) or data associated with the evidence. The data 901 within combined data 900 may be or include associated case file data at the time when the evidence has been placed in the evidence bag, sealed with the device, and is ready for assignment into the case file. Evidence management software includes computer instructions to link and combine data 901 to form a hash, also referred to as "mother hash" 800. Some exemplary types of data 901 include digital files confiscated during investigation, such as digital photographs, internet search histories, emails, and other such digital evidence.

Evidence management software executes computer instructions to combine hash 600 with hash 800. Once the hash 600 (also referred to as scanning device hash) is combined hash 800 (also referred to as software hash), the two combined hashes generate a single hash, also referred to as "marriage hash" 902. Hash 800 will be updated and written again to the blockchain any time data 901 or data 900 is updated or new data is added. This will cause "marriage" hash 902 to update and be re-written to the blockchain. All historical "mother" and "marriage" hashes will remain in the immutable blockchain record. Furthermore, hash 600 will be updated and written again to the blockchain any time a new zip tie or RFID tag is introduced, which would force an update to hash 902. Hash 902 is entered into the blockchain 904, which may be stored onto a computer. In some aspects, a private key 700 is required to access data within blockchain 904 and/or combined data 900. For example, private key 700 may be generated via login credentials or other unique identifiers. Thus, private key 700, or similar login credentials, may be used to identify, track, and/or monitor users and/or devices that are used to access and/or modify combined data 900 and/or blockchain 904. In some aspects, private key 700 is the same or is linked with identification 112 of fastener 100.

When physical or other evidence that has been documented (e.g., stored) within the evidence tracking software is placed into the evidence bag and sealed therein using the zip tie and RFID tag (or other such devices disclosed herein), a linking or "marriage" between the physical evidence and physical components of the evidence tracking system and the digital aspects of the evidence tracking system (i.e., the data stored in the evidence management software that is linked to or associated with the physical evidence) occurs. This link is created in the blockchain, which serves as an unbreakable foundation for tracking of the evidence.

Additional evidence bags and/or data entered into a particular case file will result in entry into the same blockchain 904. Thus, each blockchain entry 905 builds upon the previous entries into overall blockchain 904. It would be understood that the blockchain may be, for example, case based, agency based, or permissioned where any user of the software can write to the blockchain with an agency identifier that permits access to certain data on the blockchain. As such, each addition, deletion, modification, or other interaction with physical evidence or combined data 900 generates a transactional log in the blockchain 904 of entries 905, which is inalterable. As such, any doubt that someone went back at a later time and removed an item of evidence or added one without proof and documentation existing is removed. In use, exculpatory evidence will be disclosed due to the fact that, if something is not produced or is produced in an altered state, the hash values in the associated blockchain 904 will not match, indicating that something has been withheld, added, or altered after the fact. All transactions associated with the evidence and combined data will be tracked within the evidence management software using the blockchain, which may be private or public.

Figure 15:
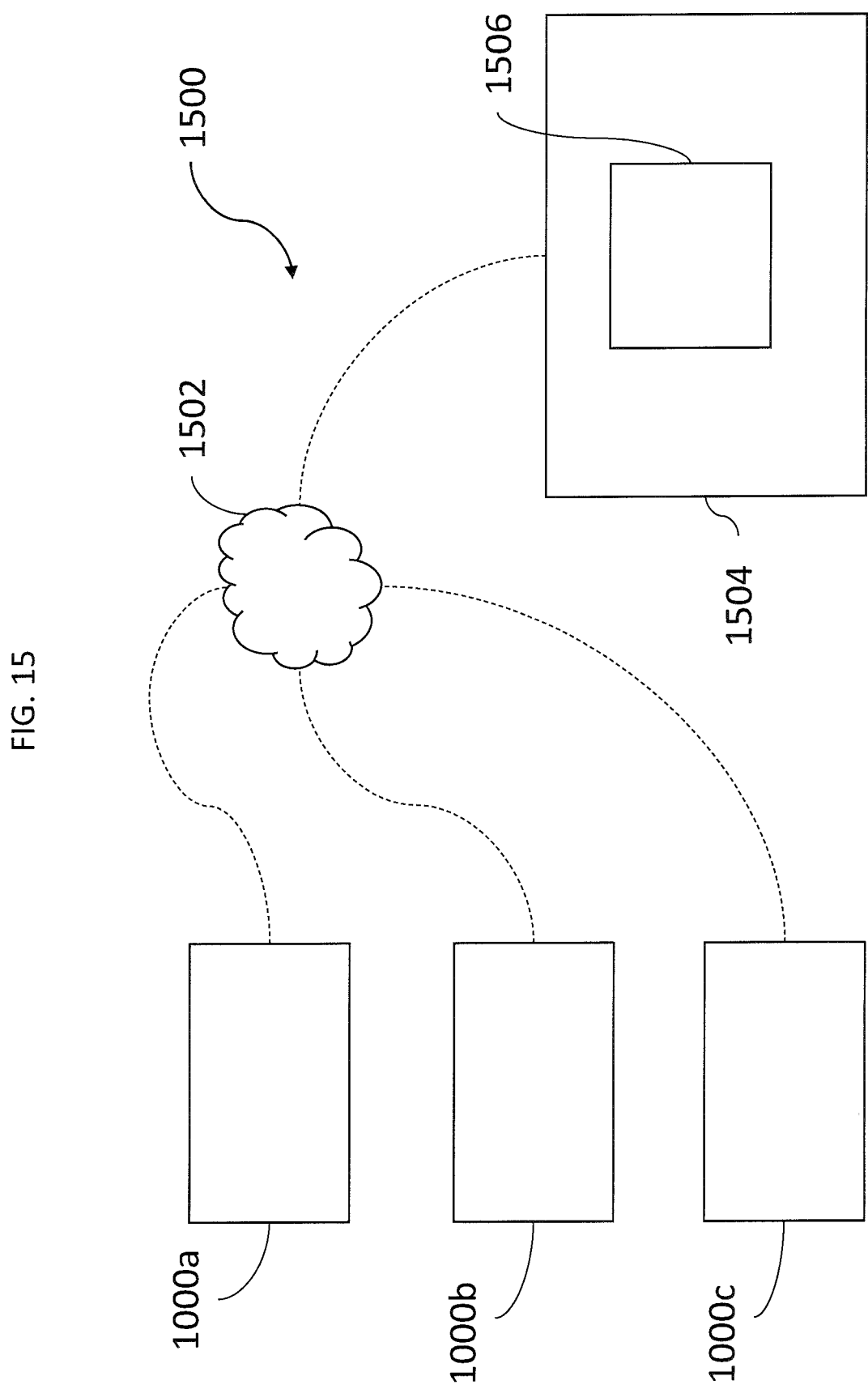
FIG. 15 is a schematic of a tracking system.

FIG. 15 depicts an exemplary tracking system 1500 (e.g., evidence tracking system). Tracking system 1500 includes management server 1504 (e.g., evidence management software), which may be a computer or computers, including a processor or processors, data storage, and any other components of a computer, computer farm, or distributed network of computers, including cloud-based systems. Management server 1504 (e.g., evidence management server) includes management software 1506 (e.g., evidence management software) stored thereon in a non-transitory storage medium, such as the data storage of the server 1504 (e.g., within a hard drive thereof). Management server 1504 is in data communication with tracking assemblies 1000a-1000c (e.g., evidence tracking assemblies), which may include an assembly of a fastener, wireless tracking device, and container, and/or a handheld scanner thereof, via wireless network 1502 for wireless monitoring of times, such as evidence. Management server 1504 may be in direct data communication with tracking assemblies 1000a-1000c, or in indirect data communication with tracking assemblies 1000a-1000c through scanning devices (e.g., tablet computers, handheld RFID scanners, etc.).

Walkthrough Use of the Hardware and Software in a Law Enforcement Environment

One exemplary use of the presently disclosed hardware and software in a law enforcement environment will now be described. However, the presently disclosed hardware and software is not limited to use in a law enforcement environment, and may be used in other applications for tracking items other than evidence.

Use of the presently disclosed hardware and software in association with a crime scene may include the following steps and/or features: (1) an officer or lab tech arrives at crime scene; (2) a case number is assigned by the agency system or dispatcher; (3) evidence is identified at the scene and photographed; (4) evidence is physically collected and transported for testing and/or storage; (5) the officer/lab tech collects evidence and places it into a bag, which may be, but is not necessarily, one of the evidence bags disclosed herein; (6) the officer/lab tech may carry a supply of zip ties or other fastener and RFID tags or other wireless tracking device disclosed herein; (7) the officer/lab tech inserts a zip tie or other fastener into an RFID tag or other wireless tracking device and scans one of the QR codes or other machine-readable identifiers thereon, initiating authorized access to the evidence management software, optionally using a private key; (8) the software recognizes the QR Code serial number (ECM, enterprise content management) as a new item and requests the scan of the second QR code on the item not yet scanned (e.g., the zip tie or RFID tag); (9) the officer/lab tech receives a prompt/confirmation to "marry" the two items; (10) in some embodiments, confirmation is received, and a prompt is given for the case number assigned by dispatch, which the officer/lab tech enters; (11) the software updates the RFID tag with time, date, zip tie serial number, GPS location, officer/lab tech credentials (which may be captured or entered at login), case number, and any additional information required by the relevant agency; (12) the software assigns an available evidence number to the RFID tag and requests the officer/lab tech to enter item descriptions for the items being put into the bag; (13) upon completion of putting the items in the bag, the officer/lab tech requests to close and seal the bag; (14) the software requests visual confirmation (e.g., a photograph) of the serial number in relation to the RFID signal and authorizes sealing of the bag, if confirmed; (15) the officer/lab tech closes the top of the bag, places the zip tie around the bag and through the slots (channels) on the RFID tag and the zip tie, and pulls the zip tie to secure the items in the bag; (16) the software asks for confirmation of seal and upon verification closes out the blocks of the blockchain associated with the bag and seal; (17) the software requests confirmation for a new RFID tag/zip tie "marriage", repeating the process until all evidence collection has been completed.

In some aspects, the system disclosed herein may work offline through a local software application on a computer tablet or other device, such as if internet is not available. Serial numbers on the zip tie/RFID tag may be associated with evidence item numbers, such that there is no risk of duplication of assigned item numbers by multiple parties collecting evidence at the same time/location.

Continuing the above sequence of steps: (18) upon receipt at the next location, the RFID tag is scanned; (19) the software recognizes all ECM and data information contained on the chip and opens the case and evidence management software to that particular bag of evidence; (20) the RFID scan updates the software with the identification credentials of the person scanning the tag, thus updating the chain of custody record; (21) the RFID tag is updated with new location information; (22) the officer/lab tech may assign a storage location for the bag, which is again updated in the software and RFID tag; (23) the officer/lab tech may update the software that a breach will occur to allow for handling of the evidence (e.g., drying, testing, photographing, etc.); (24) breaching the bag will require physical cutting of the zip tie; (25) the software will have been updated with the further actions required for the evidence previously contained in the bag; (26) if all evidence is to be returned to the same bag, the prior cut zip tie will be removed and a new zip tie will be inserted and "married" to the same RFID tag (this information is updated in the software and blockchain); (27) some evidence may be packed into separate bags, again, following the same process as the onsite collection and the reused tag scenario will occur (the software provides all prompts and confirmations); (28) the RFID tags will communicate with handheld or stationary scanners within approximately 10 ft or less; and (29) and the stationary scanners may be positioned throughout a facility, entrance/exit locations, rooms, shelves, etc., and all scanners will update the RFID tag and the software as to the movement and location of the tag/evidence occurs. The process is not limited to necessarily including each of the above steps in the above order. Some of steps (1)-(29) may be eliminated or performed in a different order.

For example, with reference to FIG. 16, tracking system 1600 (e.g., evidence tracking system) may include tracking facility 1602 (e.g., evidence tracking facility), such as a warehouse or room or other space where evidence or other items may be kept. Positioned within tracking facility 1602 are a plurality of the tracking assemblies 1604a-1604f (e.g., evidence tracking assemblies) disclosed herein (i.e., containers that contain items having fasteners coupled with wireless trackers coupled therewith to seal the containers closed). Each tracking assembly 1604a-1604f includes an RFID tag or other wireless tracker that wirelessly communicates with scanners 1606a-1606j positioned throughout facility 1602, such as handheld or stationary scanners. Scanners 1606a-1606j are positioned through facility 1602, including at entrance 1610 and exit 1612. Scanners 1606a-1606j receive location information from the RFID tags within range, and may transmit that location information to management server 1616 (e.g., evidence management server), which may be at the facility 1602 or remotely located, for input into management software (e.g., evidence management software) thereon. As such, the movement of evidence or other items within facility 1602 may be tracked. For example, if tracking assembly 1604a is moved from the position as shown in FIG. 16, past scanners 1606d and 1606e towards entrance 1610, then this movement of the tracking assemblies 1604a will be tracked via scanners 1606d and 1606e and logged into the blockchain associated with tracking assembly 1604a.

In operation, any activities associated with the creation, breach, movement, and/or destruction of a sealed bag will be annotated in the software with the last known activities stored in the RFID chip and in the management software blockchain. Using the software in a blockchain environment creates an immutable log of chain of custody transactions. Use of the RFID tag creates a seamless bond between physical evidence (evidence within the evidence bag) and digital evidence (evidence within the combined data file), or between other physical items, such as corporate inventory items, and digital files associated therewith. The use of the presently disclosed systems, methods, and apparatus may greatly reduce or eliminate the opportunities for human error in the chain of custody process. Every physical item and every electronic item (e.g., officer report, documents, images, recordings, etc.) is tracked in the blockchain, making it impossible to alter, add, remove, modify, or destroy any of these items of evidence without creating evidence that such an action took place.

In some aspects, protocols for all rooms or areas containing items that fall under chain of custody guidelines have authorized access control measures in place. To locate a specific item to remove or manipulate the item (e.g., item of evidence), the location of the item is identified through authorized access to the management system. For the system to reveal the location of the item, the authorized user answers a query by the management software as to "why" access is needed. The "why" that is input into the management software must be a valid and authorized reason, which can be "pre-authorized" by the next step in the process. For example, in the case of a request for testing, the lab can submit a request, which would be a pre-authorization required by the management system, which would then notify the property clerk of the need to retrieve the item and permit access to its location upon request. Or, a property clerk could also answer the query without pre-authorization by answering that retrieval is required for testing; thus, allowing access to the location of the item. The management software interacts with the RFID tags for that specific container and item, along with the RFID readers, and the management software will be programmed to send an appropriate violation notification to a designated management personnel if the RFID tags do not re-appear on the designated RFID readers within a required timeframe.

As would be clear from reading the forgoing, the systems, methods, and apparatus disclosed herein reduce or eliminate the impact of human and/or environmental risks associated with the handling of evidence or other items, thus ensuring the integrity of the chain of custody of evidence. However, the disclosed systems, methods, and apparatus may be employed in a broad spectrum of other applications. For example, the disclosed systems, methods, and apparatus may be employed in corporate or other scenarios to track inventory items, such as for product security and accounting purposes.

Wired Container

With reference to FIG. 17, in some aspects the containers disclosed herein may be entirely or at least partially composed of a wire mesh material and/or have one or more microwires incorporated therein, here shown as wire 1700. Wire 1700 may form at least a portion of the material of the container or may be woven through at least a portion of the material of container. Wire 1700 may be configured to interact with wireless tracking device 200 (e.g., an active or passive RFID tag) to facilitate the identification of and alert of the occurrence of a breach of the associated container. Wire 1700 may be incorporated into the container and configured to detect a breach of the container via changes in resistance when used in conjunction with an active RFID unit or other wireless tracking device. Thus, wire 1700 may be electrically coupled to wireless tracking device 200 via an electrical connection, such as via plugging in a connector on the ends of wire 1700 into a port on wireless tracking device 200. Detected changes in resistance may be indicative of a breach, and wireless tracking device 200 may transmit a signal indicating the occurrence of a breach.

Exemplary Embodiments

Certain embodiments of the present disclosure will now be set forth.

Embodiment 1. An evidence tracking system, the system comprising: a wireless tracker, the wireless tracker including a machine-readable identification and an antenna configured to receive and transmit wireless signals; a fastener, the fastener including a machine-readable identification; and an evidence container, the evidence container configured to receive and contain evidence; wherein the fastener is configured to couple with the wireless tracker and the evidence container, such that the fastener secures with the wireless tracker, secures the wireless tracker to the evidence container, and secures the evidence container in a closed configuration.

Embodiment 2. The system of embodiment 1, wherein the machine-readable identification of the fastener and the machine-readable identification of the wireless tracker are linked.

Embodiment 3. The system of embodiment 1 or 2, wherein the fastener further comprises a human-readable identification thereon.

Embodiment 4. The system of any of embodiments 1 to 3, wherein the fastener is irreversibly securable into a fastened configuration configured to couple with the wireless tracker and the evidence container.

Embodiment 5. The system of any of embodiments 1 to 4, wherein the fastener includes a zip tie, the zip tie including a strap and a locking structure.

Embodiment 6. The system of any of embodiments 1 to 5, wherein the machine-readable identifications are optically readable.

Embodiment 7. The system of any of embodiments 1 to 6, wherein the machine-readable identifications are Quick Response codes.

Embodiment 8. The system of embodiment 3, wherein the human-readable identification includes visually decipherable indicia.

Embodiment 9. The system of any of embodiments 1 to 8, wherein the wireless tracker comprises a radio frequency identification tag.

Embodiment 10. The system of any of embodiments 1 to 9, wherein the wireless tracker comprises a body, wherein the antenna is on or within the body, and wherein the wireless tracker further comprises circuitry and a battery on or within the body, the circuitry and battery in electrical communication with the antenna.

Embodiment 11. The system of any of embodiments 1 to 10, wherein the wireless tracker is powered via electromagnetic charge from wireless signals.

Embodiment 12. The system of any of embodiments 1 to 11, wherein the wireless tracker comprises a body and a cavity within the body, wherein the cavity is configured to engage with a portion of the fastener when the fastener is coupled with the wireless tracker.

Embodiment 13. The system of embodiment 12, wherein the fastener is a zip tie including a strap coupled with a locking structure, and wherein the locking structure is configured to fit within the cavity when the fastener is coupled with the wireless tracker.

Embodiment 14. The system of embodiment 13, further comprising a first channel through the body, including a first channel entrance and a first channel exit; and a second channel through the body, including a second channel entrance and a second channel exit; wherein the strap engages within the first and second channels when the fastener is coupled with the wireless tracker.

Embodiment 15. The system of embodiment 14, wherein, when the fastener is coupled with the wireless tracker, the strap is engaged through the first channel, the locking structure of the fastener is engaged within the cavity, and a portion of the strap extending out of the first channel is engaged through the channel of the locking structure, and a portion of the strap extending out of the channel of the locking structure extents through the second channel.

Embodiment 16. The system of any of embodiments 1 to 15, wherein the wireless tracker comprises a container fastener configured for attachment with the evidence container.

Embodiment 17. The system of embodiment 16, wherein the container fastener includes a spike positioned on and extending from a surface of the wireless tracker.

Embodiment 18. The system of any of embodiments 1 to 17, wherein the wireless tracker comprises a remotely actual signaling device.

Embodiment 19. The system of embodiment 18, wherein the signaling device comprise a visible signaling device, an audible signaling device, a tactile signaling device, or combinations thereof.

Embodiment 20. The system of any of embodiments 1 to 20, wherein the evidence container is an evidence bag.

Embodiment 21. The system of any of embodiments 1 to 21, wherein a size, shape, color, or combinations thereof of the evidence container corresponds with contents of the evidence container.

Embodiment 22. The system of embodiment 21, wherein the size, shape, color, or combinations thereof of the evidence container is visually indicative of the contents of evidence container.

Embodiment 23. The system of any of embodiments 1 to 22, wherein the evidence container comprises a bio-degradable material, a water-proof or water-resistant material, a fire-proof or fire-resistant material, a mold-proof or mold-resistant material, an opaque material, a material that is permeable to gas, or combinations thereof.

Embodiment 24. The system of any of embodiments 1 to 23, wherein the evidence container comprises a natural fabric or synthetic fabric.

Embodiment 25. The system of any of embodiments 1 to 24, wherein the evidence container does not include plastic, does not include paper, or does not include plastic and paper.

Embodiment 26. The system of any of embodiments 1 to 25, wherein the evidence container comprises a body, the body defining a container cavity configured to receive evidence when the evidence container is in an open configuration and to contain evidence when the evidence container is in the closed configuration.

Embodiment 27. The system of any of embodiments 1 to 26, further comprising an evidence management software stored on one or more computers in data communication with the wireless tracker, the evidence management software stored in a non-transitory computer readable medium of the one or more computers, wherein the evidence management software is configured to receive and store the wireless signals from the wireless tracker.

Embodiment 28. The system of embodiment 27, wherein the evidence management software comprises: computer instructions to receive scanned machine-readable identifiers of the fastener and the wireless tracker, and to combine or link the scanned machine-readable identifiers, generating a first hash; a data file comprising a plurality of digital evidence associated with physical evidence contained within the evidence container, and computer instructions to generate a second hash associated with the data file; and computer instructions to combine the first hash with the second hash, generating a third hash, and to enter the third hash into a blockchain in a case file.

Embodiment 29. The system of embodiment 28, wherein the evidence management software further comprises computer instructions to require a private key to access data within the blockchain and case file.

Embodiment 30. The system of embodiment 28 or 29, wherein the evidence management software further comprises computer instructions to, upon input of additional digital or physical evidence in the case file, record an associated entry into the blockchain.

Embodiment 31. The system of embodiment 30, wherein each addition, deletion, or modification of the case file generates a transactional log in the blockchain.

Embodiment 32. The system of any of embodiments 28 to 31, wherein the wireless tracker comprises a computer chip, wherein the computer chip is programmed to be associated with the digital and physical evidence and with the machine-readable identifications.

Embodiment 33. The system of any of embodiments 28 to 32, wherein the blockchain forms a record of all activity of the wireless tracker.

Embodiment 34. The system of any of embodiments 28 to 33, wherein combining the second hash with the first hash to generate the third hash links the physical evidence with the digital evidence via the blockchain.

Embodiment 35. The system of any of embodiments 1 to 34, further comprising a plurality of scanners configured to receive wireless signals from the wireless tracker, wherein the plurality of scanners are arranged in positional relationship to the wireless tracker within a space, and are configured to track movement of the wireless tracker within the space.

Embodiment 36. A method of tracking evidence, the method comprising: scanning machine-readable identifications on both a fastener and a wireless tracker; generating a first blockchain hash in an evidence management software using the scanned machine-readable identifications on both the fastener and the wireless tracker; assigning the generated first blockchain hash to physical evidence; placing the physical evidence within an evidence container; coupling the fastener with the wireless tracker and with the evidence container, such that the fastener secures the wireless tracker to the evidence container and secures the evidence container in a closed configuration with the evidence contained within the evidence container; and monitoring wireless signals emitted from the wireless tracker.

Embodiment 37. The method of embodiment 36, further comprising securing a second fastener of the wireless tracker into the evidence container.

Embodiment 38. The method of embodiment 36 or 37, further comprising generating a second blockchain hash associated with digital evidence, and combining the first and second blockchain hashes into a combined blockchain hash.

Embodiment 39. The method of any of embodiments 36 to 38, further comprising programming a computer chip of the wireless tracker to be associated with the physical evidence and with the scanned machine-readable identifications.

Embodiment 40. The method of any of embodiments 36 to 39, wherein monitoring wireless signals emitted from the wireless tracker includes monitoring a location of the wireless tracker, monitoring which wireless signal scanners detect the wireless tracker, monitoring accounts associated with the wireless signal scanners that detect the wireless tracker, monitoring a time and date, or combinations thereof.

Embodiment 41. A wireless evidence tracker comprising: a body; a machine-readable identification on or in the body; and an antenna on or in the body, the antenna configured to receive and transmit wireless signals; wherein the body is configured to be coupled with a fastener and an evidence bag.

Embodiment 42. The wireless evidence tracker of embodiment 41, wherein the wireless evidence tracker includes a radio frequency identifier (RFID).

Embodiment 43. A fastener for coupling a wireless evidence tracker to an evidence bag, the fastener comprising: a body, the body including a strap coupled with a locking structure; a machine-readable identification in or on the body; and a human-readable identification in or on the body, wherein the machine-readable identification and the human-readable identification are linked.

Embodiment 44. The fastener of embodiment 43, wherein the fastener includes a zip tie, and wherein the strap is lockingly engageable with the locking structure.

Embodiment 45. An evidence container, the evidence container comprising: a body; and a cavity at least partially defined by the body; wherein the cavity is configured to receive evidence when the evidence container is in an open configuration, and wherein the cavity is configured to contain evidence when the evidence container is in a closed configuration.

Embodiment 46. An evidence management system comprising: evidence management software stored on a computer and in data communication with a plurality of wireless trackers, wherein the evidence management software is stored in non-transitory computer readable medium of the computer; and wherein the evidence management software is configured to receive and store wireless signals from the plurality of wireless trackers.

Embodiment 47. The system of embodiment 46, wherein the evidence management software comprises: computer instructions to receive scanned machine-readable identifiers of the fastener and the wireless tracker, and to combine or link the scanned machine-readable identifiers, generating a first hash; a data file comprising a plurality of digital evidence associated with physical evidence contained, and computer instructions to generate a second hash associated with the data file; and computer instructions to combine the first hash with the second hash, generating a third hash, and to enter the third hash into a blockchain in a case file, wherein each addition, deletion, or modification of the case file generates a transactional log in the blockchain.

Although the present embodiments and advantages have been described in detail, it should be understood that various changes, substitutions and alterations can be made herein without departing from the spirit and scope of the disclosure. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A tracking system, the system comprising:
    a wireless tracker, the wireless tracker including a first machine-readable identification and an antenna configured to transmit wireless signals;
    a fastener, the fastener including a second machine-readable identification; and
    a container;
    wherein the fastener is a separate structure from the wireless tracker and from the container, and wherein the fastener is selectively couplable with the wireless tracker and with the container, such that the wireless tracker is securable to the container and such that the container is securable into a closed configuration;
    a management software stored on one or more computers that are in data communication with the wireless tracker, the management software stored in a non-transitory computer readable medium of the one or more computers, the management software comprising:
        computer instructions to receive a scan of the first machine-readable identification;
        computer instructions to receive a scan of the second machine-readable identification;
        computer instructions to generate a first blockchain hash, the first blockchain hash assigned to a combination of the scans of the first and second machine-readable identifications;
        a digital data file comprising digital data;
        computer instructions to generate a second blockchain hash, the second blockchain hash assigned to the digital data file; and
        computer instructions generate a third blockchain hash and to enter the third blockchain hash into a blockchain of a case file, wherein the third blockchain hash is assigned to a combination of the first blockchain hash and the second blockchain hash.
2. The system of claim 1, wherein the fastener further comprises a human-readable identification thereon.
3. The system of claim 1, wherein the fastener includes a zip tie, the zip tie including a strap and a locking structure.
4. The system of claim 1, wherein the machine-readable identifications are optically readable.
5. The system of claim 1, wherein the machine-readable identifications are Quick Response codes.
6. The system of claim 1, wherein the wireless tracker comprises a radio frequency identification tag.
7. The system of claim 1, wherein the wireless tracker comprises a body and a cavity within the body, wherein the cavity is configured to engage with a portion of the fastener when the fastener is coupled with the wireless tracker.
8. The system of claim 7, wherein the fastener is a zip tie including a strap coupled with a locking structure, and wherein the locking structure is configured to fit within the cavity when the fastener is coupled with the wireless tracker.
9. The system of claim 8, further comprising a first channel through the body, including a first channel entrance and a first channel exit; and a second channel through the body, including a second channel entrance and a second channel exit; wherein the strap engages within the first and second channels when the fastener is coupled with the wireless tracker.
10. The system of claim 9, wherein, when the fastener is coupled with the wireless tracker, the strap is engaged through the first channel, the locking structure of the fastener is engaged within the cavity, and a portion of the strap extending out of the first channel is engaged through the channel of the locking structure, and a portion of the strap extending out of the channel of the locking structure extents through the second channel.
11. The system of claim 1, wherein the wireless tracker comprises a container fastener configured for attachment with the container.
12. The system of claim 1, wherein the wireless tracker comprises a remotely actual signaling device.
13. The system of claim 1, wherein a size, shape, color, or combinations thereof of the container corresponds with contents of the container.
14. The system of claim 1, wherein the management software is configured to receive and store wireless signals from the wireless tracker.
15. The system of claim 1, wherein the management software further comprises computer instructions to, upon input of additional digital or physical items in the case file, record an associated entry into the blockchain.
16. The system of claim 1, wherein the wireless tracker comprises a computer chip, wherein the computer chip is programmed to be associated with the digital and physical items and with the machine-readable identifications.
17. The system of claim 1, further comprising a plurality of scanners configured to receive wireless signals from the wireless tracker, wherein the plurality of scanners are arranged in positional relationship to the wireless tracker within a space, and are configured to track movement of the wireless tracker within the space.
18. The system of claim 1, further comprising a temperature sensor in or on the wireless tracker.
19. The system of claim 1, wherein the machine-readable identification of the wireless tracker is on a removable tag coupled with the wireless tracker.
20. The system of claim 1, wherein the fastener is irreversibly securable to the wireless tracker.
21. A method of tracking items, the method comprising:
    scanning a first machine-readable identification on a fastener;

scanning a second machine-readable identification on a wireless tracker;

generating a first blockchain hash in a management software using the scanned machine-readable identifications on both the fastener and the wireless tracker, the first blockchain hash assigned to a combination of the scans of the first and second machine-readable identifications;

assigning the generated first blockchain hash to a physical item;

placing the physical item within a container, wherein the fastener is a separate structure from the wireless tracker and from the container;

coupling the fastener with the wireless tracker and with the container, such that the fastener secures the wireless tracker to the container and secures the container in a closed configuration with the physical item contained within the container;

generating a second blockchain hash in the management software, the second blockchain hash assigned to a digital data file that contains digital data;

generating a third blockchain hash and entering the third blockchain hash into a blockchain of a case file, wherein the third blockchain hash is assigned to a combination of the first blockchain hash and the second blockchain hash; and monitoring wireless signals emitted from the wireless tracker.

22. The method of claim 21, wherein monitoring wireless signals emitted from the wireless tracker includes monitoring a location of the wireless tracker, monitoring which wireless signal scanners detect the wireless tracker, monitoring accounts associated with the wireless signal scanners that detect the wireless tracker, monitoring a time and date, or combinations thereof.

23. The method of claim 21, further comprising coupling an RFID tag with the physical item.

24. An evidence tracking system, the system comprising:

a wireless tracker comprising a radio frequency identification tag, the wireless tracker including a first Quick Response code and an antenna configured transmit wireless signals;

a fastener comprising a zip tie, the zip tie including a strap and a locking structure, wherein the fastener includes a human-readable identification and a second Quick Response code;

an evidence container, wherein the fastener is a separate structure from the wireless tracker and from the evidence container, and wherein the fastener is selectively couplable with the wireless tracker and the evidence container, such that the wireless tracker is securable to the evidence container and such that the evidence container is securable into a closed configuration; and a management software stored on one or more computers that are in data communication with the wireless tracker, the management software stored in a non-transitory computer readable medium of the one or more computers, wherein the management software comprises:

computer instructions to receive and store the wireless signals from the wireless tracker;

computer instructions to receive a scan of the first Quick Response code;

computer instructions to receive a scan of the second Quick Response code;

computer instructions to generate a first blockchain hash, the first blockchain hash assigned to a combination of the scans of the first and second Quick Response codes;

a digital data file comprising digital data;

computer instructions to generate a second blockchain hash, the second blockchain hash assigned to the digital data file; and computer instructions generate a third blockchain hash and to enter the third blockchain hash into a blockchain of a case file, wherein the third blockchain hash is assigned to a combination of the first blockchain hash and the second blockchain hash.

* * * * *